(12) United States Patent
Chang et al.

(10) Patent No.: US 10,503,318 B2
(45) Date of Patent: Dec. 10, 2019

(54) TOUCH SENSITIVE PROCESSING APPARATUS AND SYSTEM FOR DESPREADING AND METHOD THEREOF

(71) Applicant: EGALAX_EMPIA TECHNOLOGY INC., Taipei (TW)

(72) Inventors: Chin-Fu Chang, Taipei (TW); Shang-Tai Yeh, Taipei (TW); Guang-Huei Lin, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 90 days.

(21) Appl. No.: 15/184,286

(22) Filed: Jun. 16, 2016

(65) Prior Publication Data

US 2016/0370947 A1     Dec. 22, 2016

Related U.S. Application Data

(60) Provisional application No. 62/180,272, filed on Jun. 16, 2015.

(30) Foreign Application Priority Data

Dec. 31, 2015   (TW) ............................. 104144644 A

(51) Int. Cl.
  *G06F 3/041*   (2006.01)
  *G06F 3/044*   (2006.01)
(52) U.S. Cl.
  CPC ............ *G06F 3/0418* (2013.01); *G06F 3/044* (2013.01)

(58) Field of Classification Search
  None
  See application file for complete search history.

(56) References Cited

U.S. PATENT DOCUMENTS

| 2005/0195770 | A1  | 9/2005  | Baliga et al. |
| 2011/0193776 | A1* | 8/2011  | Oda ........................ G06F 3/046 345/157 |
| 2012/0182259 | A1  | 7/2012  | Han |
| 2012/0278031 | A1* | 11/2012 | Oda ....................... G06F 3/0416 702/150 |
| 2015/0153845 | A1  | 6/2015  | Chang et al. |
| 2015/0193025 | A1* | 7/2015  | Rebeschi ............ G06F 3/03545 345/174 |
| 2015/0301577 | A1* | 10/2015 | Leigh ...................... G06F 3/041 345/174 |

\* cited by examiner

*Primary Examiner* — Joseph R Haley
*Assistant Examiner* — Emily J Frank
(74) *Attorney, Agent, or Firm* — WPAT, PC

(57) ABSTRACT

A despreading method is applicable to a touch sensitive screen including multiple first electrodes being parallel to a first axis and multiple second electrodes being parallel to a second axis. The despreading method includes the following steps: coupling at least two of the second electrodes as a synchronization channel; despreading a first preamble code of a first signal frame of received signal from the synchronization channel to retrieve a first synchronization information according to a first pseudo noise code; and decoding a first data code behind the first preamble code of received signal from at least one of the first electrodes in accordance with the first synchronization information and the first pseudo noise code.

15 Claims, 3 Drawing Sheets

TOUCH SENSITIVE PROCESSING APPARATUS AND SYSTEM FOR DESPREADING AND METHOD THEREOF

CROSS REFERENCE TO RELATED APPLICATIONS

This application claims priority to U.S. patent application 62/180,272, filed on Jun. 16, 2015, and Taiwan patent application, No. 104144644, filed on Dec. 31, 2015, the disclosures of which are incorporated herein by reference.

BACKGROUND OF THE INVENTION

1. Field of the Invention

The present invention relates to a touch sensitive system, and more particularly, to a touch sensitive processing apparatus and system for despreading and method thereof.

2. Description of the Prior Art

Consumer electronic products have already been necessities of modern life. Such as tablet computers, mobile phones, and other electronic devices, most of them use the touch sensitive screen as their main input/output interface. In addition, they are also configured with WiFi wireless networking devices, such as Bluetooth devices, individual short-distance wireless communication devices, the third or fourth generation of mobile communication network equipment, wireless charging devices, global positioning systems, and so on. These wireless devices require to equip antennas in their thin, short, and limited device bodies. When these antennas transmit signals, they will cause electromagnetic interference with each other.

For example, a projected capacitive touch sensitive screen which is commonly used now, and the touch sensitive control device thereof typically adopts mutual-capacitive detection. It commands a part of or all of electrodes to emit driving signal in order to detect the external conductive objects approaching or approximating the touch sensitive screen. The emitted driving signal and the signal related to the resonance frequency of the driving signal will cause electromagnetic interference with other antennas and wireless devices in the same electronic device. Conversely, other antennas and wireless devices in the same electronic device will cause electromagnetic interference with the driving signal as well when they operate.

Accordingly, when the touch sensitive screen wants to detect the signal of the active stylus, the touch sensitive control device thereof receives not only the signal of the active stylus but also a variety of electronic interference. Therefore, in the case of interference, how to improve the detection rate of the electrical signals emitted by the active stylus in order to further obtain the approximate position of the active stylus on the touch sensitive screen and the sensing values of the sensor(s) on the active stylus are needed technologies required by the market.

SUMMARY OF THE INVENTION

In an embodiment, this invention provides a despreading method being applicable to a touch sensitive screen which includes multiple first electrodes being parallel to a first axis and multiple second electrodes being parallel to a second axis. The despreading method includes the following steps: coupling at least two of the second electrodes as a synchronization channel; despreading a first preamble code of a first signal frame of received signal from the synchronization channel to retrieve a first synchronization information according to a first pseudo noise code; and decoding a first data code behind the first preamble code of received signal from at least one of the first electrodes in accordance with the first synchronization information and the first pseudo noise code.

In certain embodiments, the first signal frame is from a first active stylus approaching the touch sensitive screen, the first data code includes at least one type of following information: a pressure on a tip section of stylus; sensing value presenting whether a button being pressed or not; sensing value of attitude of a gyroscope; sensing value of acceleration of an accelerometer; sensing value of battery power; serial number of stylus; and wireless signal intensity received by stylus.

In certain embodiments, the synchronization channel couples all of the multiple second electrodes.

In certain embodiments, an electrical signal used for decoding the first data code is from one of the multiple first electrodes which receives a largest electrical signal amount.

In certain embodiments, an electrical signal used for decoding the first data code is from some of the multiple first electrodes. The despreading method further includes the following steps: calculating multiple deviations of signal correlations of the multiple first electrodes according to the first synchronization information; and calculating a position of the first active stylus (emitting the first signal frame) on the second axis according to the multiple deviations.

In certain embodiments, the despreading method further includes the following steps: despreading a second preamble code of a second signal frame of received signal from the synchronization channel to retrieve a second synchronization information according to a second pseudo noise code; and decoding a second data code behind the second preamble code of received signal from at least one of the multiple first electrodes in accordance with the second synchronization information and the second pseudo noise code, wherein the second signal frame is from a second active stylus approaching the touch sensitive screen.

In certain embodiments, the first signal frame and the second signal frame have at least some parts concurrently appearing in the signal received by the multiple first electrodes.

In an embodiment, this invention provides a touch sensitive system for despreading. The touch sensitive system includes a touch sensitive screen including multiple first electrodes being parallel to a first axis and multiple second electrodes being parallel to a second axis, and a touch sensitive processing apparatus connected to the multiple first electrodes and the multiple second electrodes. The touch sensitive processing apparatus is configured to perform the following steps including: coupling at least two of the multiple second electrodes as a synchronization channel; despreading a first preamble code of a first signal frame of received signal from the synchronization channel to retrieve a first synchronization information according to a first pseudo noise code; and decoding a first data code behind the first preamble code of received signal from at least one of the multiple first electrodes in accordance with the first synchronization information and the first pseudo noise code.

In an embodiment, this invention provides a touch sensitive processing apparatus for despreading. The touch sensitive processing apparatus is connected to multiple first electrodes on a touch sensitive screen which are parallel to a first axis and multiple second electrodes on the touch sensitive screen which are parallel to a second axis. The touch sensitive processing apparatus is configured to perform the following steps including: coupling at least two of the multiple second electrodes as a synchronization channel; despreading a first preamble code of a first signal frame of received signal from the synchronization channel to retrieve a first synchronization information according to a first pseudo noise code; and decoding a first data code behind the first preamble code of received signal from at least one of the multiple first electrodes in accordance with the first synchronization information and the first pseudo noise code.

In certain embodiments, the first signal frame is from a first active stylus approaching the touch sensitive screen, the first data code includes at least one type of following information: a pressure on a tip section of stylus; sensing value presenting whether a button being pressed or not; sensing value of attitude of a gyroscope; sensing value of acceleration of an accelerometer; sensing value of battery power; serial number of stylus; and wireless signal intensity received by stylus.

In certain embodiments, the synchronization channel couples all of the multiple second electrodes.

In certain embodiments, an electrical signal used for decoding the first data code is from one of the multiple first electrodes which receives a largest electrical signal amount.

In certain embodiments, an electrical signal used for decoding the first data code is from some of the multiple first electrodes. The touch sensitive processing apparatus is configured to further perform the following steps including: calculating multiple deviations of signal correlations of the multiple first electrodes according to the first synchronization information; and calculating a position of the first active stylus (emitting the first signal frame) on the second axis according to the multiple deviations.

In certain embodiments, the touch sensitive processing apparatus is configured to further perform the following steps including: despreading a second preamble code of a second signal frame of received signal from the synchronization channel to retrieve a second synchronization information according to a second pseudo noise code; and decoding a second data code behind the second preamble code of received signal from at least one of the multiple first electrodes in accordance with the second synchronization information and the second pseudo noise code, wherein the second signal frame is from a second active stylus approaching the touch sensitive screen.

In certain embodiments, the first signal frame and the second signal frame have at least some parts concurrently appearing in the signal received by the multiple first electrodes.

Accordingly, in the case of interference, this invention uses CDMA's spread spectrum technique to improve the detection rate of the electrical signals emitted by the active stylus, and then acquires the approximate position of the active stylus on the touch sensitive screen, as well as the sensing values of the sensor(s) on the active stylus. One of the advantages of this invention is that the touch sensitive processing apparatus can rapidly synchronize the electrical signals modulated by DSSS in one signal frame and then decode the data codes emitted by the active stylus. Another advantage of this invention is that when several active styluses operate at the same time, all of them are allowed to emit electrical signals simultaneously. For example, as long as they use different pseudo noise codes, even if they emit electrical signals simultaneously, the touch sensitive processing apparatus is still able to distinguish the signal frames and data codes emitted from them in the received signals.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
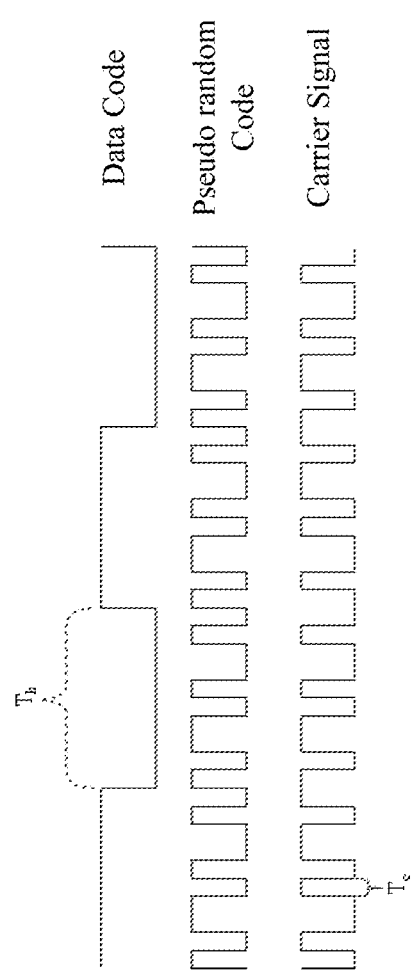
FIG. 1 depicts some waveforms of a spread spectrum technique.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Code Division Multiple Access (CDMA) is a wireless spread spectrum telecommunication technology adopted in the third generation of mobile telecommunication service. In wireless telecommunication techniques, spread spectrum means the bandwidth consumed by the carrier signal itself exceeds the bandwidth of the contents carried by the carrier signal. Using a carrier signal with bigger bandwidth allows for better tolerance to interfering noise signals during transmission. Direct Sequence Spread Spectrum (DSSS) is one of spread spectrum techniques. DSSS modulation technique employs a bit sequence code called a pseudo noise (PN). The bit sequence code or PN code includes pulse waves each with a short period, which period may be called a chip. The period of a chip is shorter than that of a data or signal code (thereinafter data code). In other words, the bandwidth consumed by a PN code is larger than that consumed by a data code. Therefore, modulating a data code of a smaller bandwidth into a PN code of a larger bandwidth means the bandwidth of the carrier signal after modulation matches or is similar to that of the PN code.

During the process of modulation with a carrier signal, a main step is to multiply a data code and a PN code, which PN code is usually a pseudo random sequence usually including a combination of 1 and −1. One characteristic of PN code is that multiplying a sequence of PN code by the same PN code returns the same PN code, because $1\times1=1$ and $-1\times-1=1$. This multiplication with the same PN code is called despreading. Accordingly, when the receiving end also knows the sequence of PN code used in the modulation process, it can perform a process of despreading to obtain the data or content code carried by the carrier signal.

Referring to FIG. 1, some waveforms of a spread spectrum technique are illustrated. The waveform on the top portion of FIG. 1 is a data code, the waveform on the middle portion of FIG. 1 is a pseudo random sequence or a so-called PN code, and the waveform on the bottom portion of FIG.

1 is a carrier signal. According to FIG. 1 it can be known that when the electric potential of the data code is high, the waveforms of the carrier signal and the PN code are opposite to each other. When the electric potential of the data code is low, the waveforms of the carrier signal and the PN code are the same. In other words, the receiving end can compare the waveforms of the carrier signal and the PN code, and when the two waveforms are opposite to each other, the receiving end can infer that the electric potential of the data code is high at this time. Conversely, when the waveforms of the carrier signal and the PN code are the same, the receiving end can infer that the electric potential of the data code is low at this time. Accordingly, the receiving end can infer the state of the electric potential of the data code as long as the PN code used is known.

Figure 2:
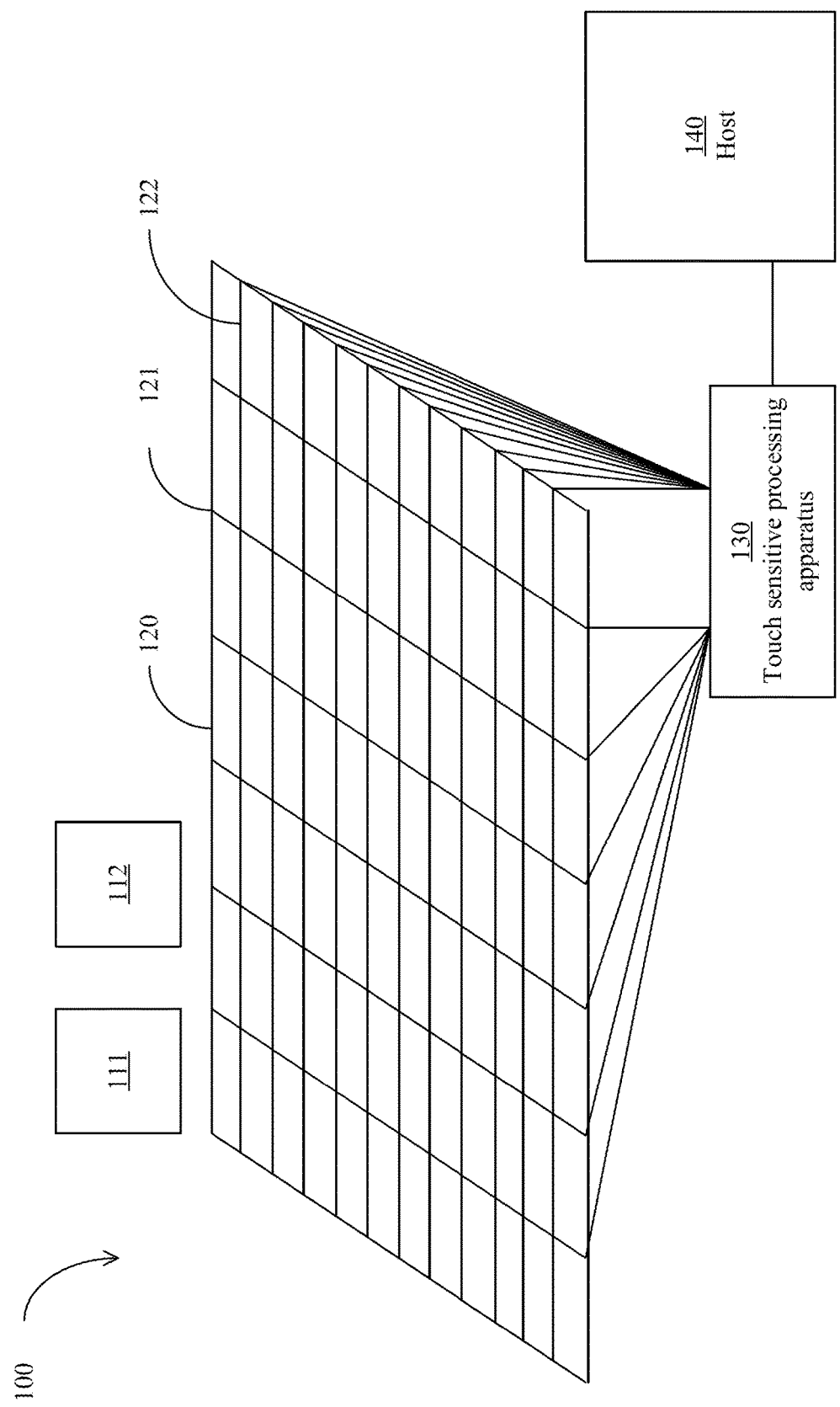
FIG. 2 depicts a schematic diagram of a touch sensitive electronic apparatus according to an embodiment of the present invention.

Referring to FIG. 2, a schematic diagram of a touch sensitive electronic apparatus 100 according to an embodiment of the present invention is illustrated. The touch sensitive electronic apparatus 100 includes a touch sensitive panel or screen 120, thereinafter touch sensitive screen 120. The touch sensitive screen 120 includes multiple first electrodes 121 being parallel to a first axis and multiple second electrodes 122 being parallel to a second axis. The first electrodes 121 and the second electrodes 122 are connected to a touch sensitive processing apparatus 130. Generally, the first axis is perpendicular to the second axis. The touch sensitive processing apparatus 130 is further connected to a host 140 to report relating touch sensitive information. In some embodiments, the relating touch sensitive information may include message(s) being relative to a first active stylus 111 and a second active stylus 112, or may also include message(s) being relative to other external conductive objects which do not actively emit electrical signals.

In some embodiments, the active stylus 111 or 112 may be commanded to code the sensing values from each sensor thereon to the data code mentioned above. The so-called sensing value of a sensor may include but not limited to the following: a pressure value on a tip section of stylus; sensing value presenting whether a button being pressed or not; sensing value of attitude of a gyroscope; sensing value of acceleration of an accelerometer; sensing value of battery power; serial number of stylus; and wireless signal intensity received by stylus. Then, the active stylus 111 or 112 codes the data code(s) mentioned above to carrier signal(s) by the process of spread spectrum according to certain a PN code. After that, the active stylus 111 or 112 emits the electrical signals including the carrier signals by the tip section thereof. After receiving the electrical signals, the touch sensitive processing apparatus of the touch sensitive screen at least obtains the following message: the proximate position of the active stylus 111 or 112 on the touch sensitive screen; the PN code form used by the active stylus 111 or 112, as well as the content of the aforementioned data code.

In the above-described process, the touch sensitive processing apparatus 130 at the receiving end must synchronize or align the received carrier signal and PN code, in order to obtain the correct (state of the) data code. However, when the active stylus 111 or 112 emits electrical signal, the touch sensitive processing apparatus 130 can not necessarily immediately synchronize the received carrier signal and PN code, which results in difficulties in obtaining/inferring the data code.

The receiving end can usually postpone the multiplication of a received known carrier signal or a local oscillator (LO) signal produced by the receiving end, and a known PN code, for a period of time, and then perform the multiplication, which postponing of multiplication may be called a correlation. When two signals are not synchronous, the calculated value of their correlation will not exceed a threshold value. Conversely, when the two signals are synchronous, the calculated value of their correlation will exceed the threshold value. And when the two signals are not synchronous, the receiving end can repetitively adjust the postponing period until the two signals are synchronous or aligned.

In one embodiment of the present invention, electrical signal or the carrier signal emitted by the active stylus may comprise a signal frame including a preamble code followed by a data code section. The data code section may be used for transmitting a sensing state of a sensor on the stylus. For example, sensing values e.g. resulting from sensing whether a button on the stylus has been pressed down, or associated with the pressure value sensed by the tip section of the stylus, can be transmitted.

In a variant of this embodiment, the active stylus 111 or 112 can emit a complete signal frame described above at intervals, to inform of the state of the sensor thereof. In another variant of this embodiment, different active styluses may have different preamble codes and/or PN codes, enabling the touch sensitive processing apparatus 130 to identify and/or distinguish at least two active styluses simultaneously approaching or touching the touch sensitive screen 120. For example, the first active stylus 111 emits a first preamble code modulated by a first PN code, the second active stylus 112 emits a second preamble code modulated by a second PN code. And then, the touch sensitive processing apparatus 130 demodulates or performs despreading to the received signal by the first PN code and the second PN code respectively, it can determine the first preamble code and/or the second preamble code having been received.

When the touch sensitive processing apparatus 130 knows the electrical signal having two preamble codes, it can determine the first active stylus 111 and the second active stylus 112 approximate the touch sensitive screen 120 according to the first PN code and the second PN code which are correspondingly associated to the first active stylus 111 and the second active stylus 112. Since the touch sensitive processing apparatus 130 knows the timing of the first PN code and the second PN code, it can make the first and the second PN codes respectively synchronize the signal frames emitted by the first active stylus 111 and the second active stylus 112, and then decodes the data code section behind the signal frame.

In one embodiment of the present invention, in order to reach the synchronous state soon, some or all of the second electrodes 122 are connected to the same line or channel, called synchronization line or synchronization channel, and the touch sensitive processing apparatus is responsible for detecting on the synchronization line or synchronization channel and performing synchronization with respect to the known preamble code.

A person of ordinary skill in the art can appreciate that when the touch sensitive processing apparatus 130 has known the PN code and the intendedly transmitted preamble code, the touch sensitive processing apparatus 130 can synchronize with the carrier signal by using well known technique(s), or find the phase shift between the carrier signal and the local oscillator signal. When ascertaining the phase shift between the two signals, any of the first electrodes 121 receiving the electrical signal is caused to decode the following data code section, in order to obtain the sensor state transmitted by the active stylus 111 or 112.

In one embodiment of the present invention, the above-described decoding step may be performed to decode the following data code section with respect to the carrier signal received by one of the first electrodes 121, wherein the received carrier signal used for decoding has the largest signal amount among all carrier signals received by all the first electrodes 121 and/or second electrodes 122.

In another embodiment of the present invention, the above-described decoding step may be performed to decode the following data code section with respect to the carrier signals received by some of the first electrodes 121, to obtain data codes which should match or be similar to each other. If the data codes obtained do not match, the data code obtained for the most instances may be regarded as the right one.

In addition, among the carrier signals received by the multiple first electrodes 121, after adjustment using the phase shift, the carrier signal that is the most correlated with the local oscillator signal should have the smallest noise and is usually received by one of the first electrodes 121 that is closest to the active stylus 111 or 112. Accordingly, the position of the active stylus 111 or 112 relative to each of the first electrodes 121 may be calculated based on deviations of multiple instances of correlation involving the carrier signal received by each first electrode 121 and adjusted by using the phase shift mentioned above. In other words, the coordinate(s) of the position of the active stylus 111 on the second axis can be calculated as well.

Figure 3:
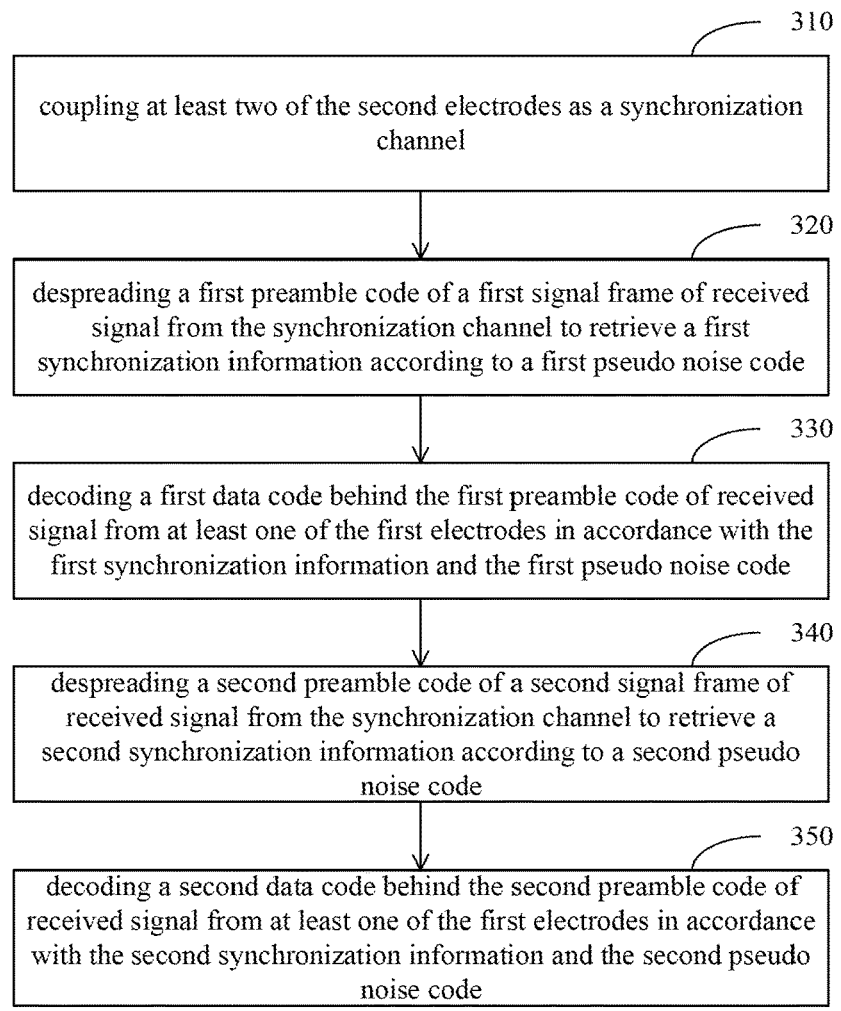
FIG. 3 shows a flowchart of despreading method according to an embodiment of the present invention.

Referring to FIG. 3, a flowchart of despreading method according to an embodiment of the present invention is illustrated. The touch sensitive processing apparatus 130 shown in FIG. 2 could perform the steps of the flowchart shown in FIG. 3, whatever by software, hardware, or the combination of software and hardware. It should be noted that the step numbers in FIG. 3 do not affect the steps performed in order except that there is a causal relationship between the steps. Moreover, other steps which do not relate to the present invention may be inserted between the steps as well.

In step 310, coupling at least two of the second electrodes as a synchronization channel. The touch sensitive processing apparatus 130 may use analog switch or digital adder to implement this step. In a variation, the synchronization channel couples all of the second electrodes.

In step 320, despreading a first preamble code of a first signal frame of received signal from the synchronization channel to retrieve a first synchronization information according to a first pseudo noise code.

In step 330, decoding a first data code behind the first preamble code of received signal from at least one of the first electrodes in accordance with the first synchronization information and the first pseudo noise code.

In a variation, an electrical signal used for decoding the first data code is from one of the multiple first electrodes which receives a largest electrical signal amount. In another variation, an electrical signal used for decoding the first data code is from some of the multiple first electrodes. In still another variation, the despreading method further includes: calculating multiple deviations of signal correlations of the multiple first electrodes according to the first synchronization information; and calculating a position of the first active stylus on the second axis according to the multiple deviations.

In step 340, despreading a second preamble code of a second signal frame of received signal from the synchronization channel to retrieve a second synchronization information according to a second pseudo noise code.

In step 350, decoding a second data code behind the second preamble code of received signal from at least one of the first electrodes in accordance with the second synchronization information and the second pseudo noise code.

In a variation, an electrical signal used for decoding the second data code is from one of the multiple first electrodes which receives a largest electrical signal amount. In another variation, an electrical signal used for decoding the second data code is from some of the multiple first electrodes. In still another variation, the despreading method further includes: calculating multiple deviations of signal correlations of the multiple first electrodes according to the second synchronization information; and calculating a position of the second active stylus on the second axis according to the multiple deviations.

One of the advantages of this invention is that the touch sensitive processing apparatus 130 can rapidly synchronize the electrical signals modulated by DSSS in one signal frame and then decode the data code section emitted by the active stylus(es) 111 and/or 112. Another advantage of this invention is that when several active styluses, such as 111 and 112, operate at the same time, all of them are allowed to emit electrical signals simultaneously. For example, as long as they use different pseudo noise codes, even if they emit electrical signals simultaneously, the touch sensitive processing apparatus 130 is still able to distinguish the signal frames and data codes emitted from them in the received signals.

In an embodiment, this invention provides a despreading method being applicable to a touch sensitive screen which includes multiple first electrodes being parallel to a first axis and multiple second electrodes being parallel to a second axis. The despreading method includes the following steps: coupling at least two of the second electrodes as a synchronization channel; despreading a first preamble code of a first signal frame of received signal from the synchronization channel to retrieve a first synchronization information according to a first pseudo noise code; and decoding a first data code behind the first preamble code of received signal from at least one of the first electrodes in accordance with the first synchronization information and the first pseudo noise code.

In certain embodiments, the first signal frame is from a first active stylus approaching the touch sensitive screen, the first data code includes at least one type of following information: a pressure on a tip section of stylus; sensing value presenting whether a button being pressed or not; sensing value of attitude of a gyroscope; sensing value of acceleration of an accelerometer; sensing value of battery power; serial number of stylus; and wireless signal intensity received by stylus.

In certain embodiments, the synchronization channel couples all of the multiple second electrodes.

In certain embodiments, an electrical signal used for decoding the first data code is from one of the multiple first electrodes which receives a largest electrical signal amount.

In certain embodiments, an electrical signal used for decoding the first data code is from some of the multiple first electrodes. The despreading method further includes the following steps: calculating multiple deviations of signal correlations of the multiple first electrodes according to the first synchronization information; and calculating a position of the first active stylus (emitting the first signal frame) on the second axis according to the multiple deviations.

In certain embodiments, the despreading method further includes the following steps: despreading a second preamble code of a second signal frame of received signal from the synchronization channel to retrieve a second synchronization information according to a second pseudo noise code;

and decoding a second data code behind the second preamble code of received signal from at least one of the multiple first electrodes in accordance with the second synchronization information and the second pseudo noise code, wherein the second signal frame is from a second active stylus approaching the touch sensitive screen.

In certain embodiments, the first signal frame and the second signal frame have at least some parts concurrently appearing in the signal received by the multiple first electrodes.

In an embodiment, this invention provides a touch sensitive system for despreading. The touch sensitive system includes a touch sensitive screen including multiple first electrodes being parallel to a first axis and multiple second electrodes being parallel to a second axis, and a touch sensitive processing apparatus connected to the multiple first electrodes and the multiple second electrodes. The touch sensitive processing apparatus is configured to perform the following steps including: coupling at least two of the multiple second electrodes as a synchronization channel; despreading a first preamble code of a first signal frame of received signal from the synchronization channel to retrieve a first synchronization information according to a first pseudo noise code; and decoding a first data code behind the first preamble code of received signal from at least one of the multiple first electrodes in accordance with the first synchronization information and the first pseudo noise code.

In an embodiment, this invention provides a touch sensitive processing apparatus for despreading. The touch sensitive processing apparatus is connected to multiple first electrodes on a touch sensitive screen which are parallel to a first axis and multiple second electrodes on the touch sensitive screen which are parallel to a second axis. The touch sensitive processing apparatus is configured to perform the following steps including: coupling at least two of the multiple second electrodes as a synchronization channel; despreading a first preamble code of a first signal frame of received signal from the synchronization channel to retrieve a first synchronization information according to a first pseudo noise code; and decoding a first data code behind the first preamble code of received signal from at least one of the multiple first electrodes in accordance with the first synchronization information and the first pseudo noise code.

In certain embodiments, the first signal frame is from a first active stylus approaching the touch sensitive screen, the first data code includes at least one type of following information: a pressure on a tip section of stylus; sensing value presenting whether a button being pressed or not; sensing value of attitude of a gyroscope; sensing value of acceleration of an accelerometer; sensing value of battery power; serial number of stylus; and wireless signal intensity received by stylus.

In certain embodiments, the synchronization channel couples all of the multiple second electrodes.

In certain embodiments, an electrical signal used for decoding the first data code is from one of the multiple first electrodes which receives a largest electrical signal amount.

In certain embodiments, an electrical signal used for decoding the first data code is from some of the multiple first electrodes. The touch sensitive processing apparatus is configured to further perform the following steps including: calculating multiple deviations of signal correlations of the multiple first electrodes according to the first synchronization information; and calculating a position of the first active stylus (emitting the first signal frame) on the second axis according to the multiple deviations.

In certain embodiments, the touch sensitive processing apparatus is configured to further perform the following steps including: despreading a second preamble code of a second signal frame of received signal from the synchronization channel to retrieve a second synchronization information according to a second pseudo noise code; and decoding a second data code behind the second preamble code of received signal from at least one of the multiple first electrodes in accordance with the second synchronization information and the second pseudo noise code, wherein the second signal frame is from a second active stylus approaching the touch sensitive screen.

In certain embodiments, the first signal frame and the second signal frame have at least some parts concurrently appearing in the signal received by the multiple first electrodes.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A despreading method being applicable to a touch sensitive screen for rapid recognition of approaching styluses, the touch sensitive screen comprising a plurality of first electrodes being parallel to a first axis and a plurality of second electrodes being parallel to a second axis, the despreading method comprising:

having an analog switch or a digital adder for coupling at least two of the plurality of second electrodes as a synchronization channel for achieving rapid detection rate and allow simultaneous detection of multiple styluses;

despreading a first preamble code of a first signal frame of received signal from the synchronization channel to retrieve a first synchronization information according to a first pseudo noise code, wherein the first signal frame is from a first active stylus approaching the touch sensitive screen;

decoding a first data code behind the first preamble code of received signal from at least one of the plurality of first electrodes in accordance with the first synchronization information and the first pseudo noise code in order to receive information from the first active stylus;

despreading a second preamble code of a second signal frame of received signal from the synchronization channel to retrieve a second synchronization information according to a second pseudo noise code, wherein the second signal frame is from a second active stylus approaching the touch sensitive screen; and decoding a second data code behind the second preamble code of received signal from at least one of the plurality of first electrodes in accordance with the second synchronization information and the second pseudo noise code in order to receive information from the second active stylus.

2. The despreading method of claim 1, wherein the first signal frame is from a first active stylus approaching the touch sensitive screen, the first data code comprises at least one type of following information:

a pressure on a tip section of stylus;

sensing value presenting whether a button being pressed or not;

sensing value of attitude of a gyroscope;

sensing value of acceleration of an accelerometer;

sensing value of battery power;
serial number of stylus; and
wireless signal intensity received by stylus.

3. The despreading method of claim 1, wherein the synchronization channel couples all of the plurality of second electrodes.

4. The despreading method of claim 1, wherein an electrical signal used for decoding the first data code is from one of the plurality of first electrodes which receives a largest electrical signal amount.

5. The despreading method of claim 1, wherein an electrical signal used for decoding the first data code is from some of the plurality of first electrodes.

6. The despreading method of claim 1, further comprising:
  calculating a plurality of deviations of signal correlations of the plurality of first electrodes according to the first synchronization information; and
  calculating a position of a first active stylus emitting the first signal frame on the second axis according to the plurality of deviations.

7. The despreading method of claim 1, wherein the first signal frame and the second signal frame have at least some parts concurrently appearing in the signal received by the plurality of first electrodes.

8. A touch sensitive system for despreading and for rapid recognition of approaching styluses, comprising:
  a touch sensitive screen, comprising a plurality of first electrodes being parallel to a first axis and a plurality of second electrodes being parallel to a second axis; and
  a touch sensitive processing apparatus, connected to the plurality of first electrodes and the plurality of second electrodes, the touch sensitive processing apparatus, comprising an analog switch or a digital adder, configured to perform the following steps comprising:
    coupling at least two of the plurality of second electrodes as a synchronization channel for achieving rapid detection rate and allow simultaneous detection of multiple styluses, wherein said coupling is implemented by the analog switch or the digital adder;
    despreading a first preamble code of a first signal frame of received signal from the synchronization channel to retrieve a first synchronization information according to a first pseudo noise code, wherein the first signal frame is from a first active stylus approaching the touch sensitive screen;
    decoding a first data code behind the first preamble code of received signal from at least one of the plurality of first electrodes in accordance with the first synchronization information and the first pseudo noise code in order to receive information from the first active stylus;
    despreading a second preamble code of a second signal frame of received signal from the synchronization channel to retrieve a second synchronization information according to a second pseudo noise code, wherein the second signal frame is from a second active stylus approaching the touch sensitive screen; and
    decoding a second data code behind the second preamble code of received signal from at least one of the plurality of first electrodes in accordance with the second synchronization information and the second pseudo noise code in order to receive information from the second active stylus.

9. A touch sensitive processing apparatus for despreading and rapid recognition of approaching styluses, connected to a plurality of first electrodes being parallel to a first axis and a plurality of second electrodes being parallel to a second axis on a touch sensitive screen, the touch sensitive processing apparatus, comprising an analog switch or a digital adder, configured to perform the following steps comprising:
  coupling at least two of the plurality of second electrodes as a synchronization channel for achieving rapid detection rate and allow simultaneous detection of multiple styluses, wherein said coupling is implemented by the analog switch or the digital adder;
  despreading a first preamble code of a first signal frame of received signal from the synchronization channel to retrieve a first synchronization information according to a first pseudo noise code, wherein the first signal frame is from a first active stylus approaching the touch sensitive screen;
  decoding a first data code behind the first preamble code of received signal from at least one of the plurality of first electrodes in accordance with the first synchronization information and the first pseudo noise code in order to receive information from the first active stylus;
  despreading a second preamble code of a second signal frame of received signal from the synchronization channel to retrieve a second synchronization information according to a second pseudo noise code, wherein the second signal frame is from a second active stylus approaching the touch sensitive screen; and
  decoding a second data code behind the second preamble code of received signal from at least one of the plurality of first electrodes in accordance with the second synchronization information and the second pseudo noise code in order to receive information from the second active stylus.

10. The touch sensitive processing apparatus of claim 9, wherein the first signal frame is from a first active stylus approaching the touch sensitive screen, the first data code comprises at least one type of following information:
  a pressure on a tip section of stylus;
  sensing value presenting whether a button being pressed or not;
  sensing value of attitude of a gyroscope;
  sensing value of acceleration of an accelerometer;
  sensing value of battery power;
  serial number of stylus; and
  wireless signal intensity received by stylus.

11. The touch sensitive processing apparatus of claim 9, wherein the synchronization channel couples all of the plurality of second electrodes.

12. The touch sensitive processing apparatus of claim 9, wherein an electrical signal used for decoding the first data code is from one of the plurality of first electrodes which receives a largest electrical signal amount.

13. The touch sensitive processing apparatus of claim 9, wherein an electrical signal used for decoding the first data code is from some of the plurality of first electrodes.

14. The touch sensitive processing apparatus of claim 9, further configured to perform the following steps comprising:
  calculating a plurality of deviations of signal correlations of the plurality of first electrodes according to the first synchronization information; and
  calculating a position of a first active stylus emitting the first signal frame on the second axis according to the plurality of deviations.

15. The touch sensitive processing apparatus of claim 9, wherein the first signal frame and the second signal frame have at least some parts concurrently appearing in the signal received by the plurality of first electrodes.

\* \* \* \* \*